United States Patent
Lipke et al.

(10) Patent No.: US 10,547,601 B2
(45) Date of Patent: Jan. 28, 2020

(54) SYSTEM AND METHOD TO ALLOW THIRD-PARTY DEVELOPER TO DEBUG CODE IN CUSTOMER ENVIRONMENT

(71) Applicant: salesforce.com, inc., San Francisco, CA (US)

(72) Inventors: Nathan Edward Lipke, Denver, CO (US); David Ross Baker, San Francisco, CA (US); Nicholas Chun Yuan Chen, San Francisco, CA (US); Jonathan Widjaja, San Francisco, CA (US); Winston Chow, San Mateo, CA (US); Josh Kaplan, Orinda, CA (US); Gregory Wester, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 317 days.

(21) Appl. No.: 15/394,307

(22) Filed: Dec. 29, 2016

(65) Prior Publication Data

US 2017/0353458 A1    Dec. 7, 2017

Related U.S. Application Data

(60) Provisional application No. 62/346,488, filed on Jun. 6, 2016.

(51) Int. Cl.
*H04L 29/06* (2006.01)
*G06F 11/36* (2006.01)

(52) U.S. Cl.
CPC ............ *H04L 63/08* (2013.01); *G06F 11/362* (2013.01); *G06F 11/3664* (2013.01)

(58) Field of Classification Search
CPC ...................................................... H04L 63/08
See application file for complete search history.

(56) References Cited

U.S. PATENT DOCUMENTS

| 6,263,456 | B1 * | 7/2001 | Boxall | G06F 11/362 |
| | | | | 709/217 |
| 6,393,437 | B1 * | 5/2002 | Zinda | G06F 8/20 |
| | | | | 200/203 |
| 9,262,300 | B1 * | 2/2016 | Haba | G06F 11/362 |
| 9,405,658 | B1 * | 8/2016 | Webster | G06F 11/362 |
| 9,471,466 | B1 * | 10/2016 | Garcia | G06F 11/3664 |

(Continued)

*Primary Examiner* — Simon P Kanaan
(74) *Attorney, Agent, or Firm* — Morris & Kamlay LLP

(57) ABSTRACT

A platform is provided to allow the developer to log into a subscriber's computer system by using the credential of the developer or the subscriber to view and to debug at least a portion of executable code that is used by the subscriber. The executable code used by the subscriber may be part of managed package code, at least portions of which are customized for various subscribers. Cooperative debugging may be provided between developer and subscriber with lifting of code encapsulation for the developer in the subscriber implementation. The developer and the subscriber may be granted debugging licenses each authorizing a limited number of debugging sessions, and each debugging session run by the developer may be counted against the debugging license of either the developer or the subscriber. Debugging licenses may be transferred between the developer and the subscriber.

26 Claims, 15 Drawing Sheets

(56) References Cited

U.S. PATENT DOCUMENTS

2013/0167123 A1* 6/2013 Dura .................. G06F 11/3624
717/127
2013/0219363 A1* 8/2013 Wu ..................... G06F 11/3664
717/124
2014/0173565 A1* 6/2014 Scholl ................ G06F 11/3664
717/124

* cited by examiner

Subscriber Organizations

| Organization Name | Organization ID |
|---|---|
| Subscriber 1 | 00ABCD000001 |
| Subscriber 2 | 00ABCD000002 |
| Subscriber 3 | 00ABCD000003 |
| Subscriber 4 | 00ABCD000004 |

Subscriber Overview
Subscriber 3

1100

Organization Name
Primary Contact
Address
Phone
Email

| Action | User | User Name |
|---|---|---|
| Login | Subscriber 3 User | subscriber3@acme.com |

| Code Name | Version | Namespace | Total Licenses | Developer Licenses | Subscriber Licenses |
|---|---|---|---|---|---|
| Package.sales | 1.6 | packageforce | 16 | 6 | 10 |

SYSTEM AND METHOD TO ALLOW THIRD-PARTY DEVELOPER TO DEBUG CODE IN CUSTOMER ENVIRONMENT

CROSS-REFERENCE TO RELATED APPLICATIONS

This application claims priority to U.S. Provisional Application No. 62/346,488, filed Jun. 6, 2016, the content of which is hereby incorporated by reference in its entirety.

BACKGROUND

Modern software is often provided as a hosted service, where a software provider gives access to a software platform to multiple subscribers, who then use the software on their own computing systems, the provider's systems, or a combination of the two. The software provider may make modifications to the software platform that typically are provided to all users. In some cases, a software provider also may allow third-party developers to develop applications within the environment provided by the software provider, and/or to make modifications to individual subscribers' or users' instances of software programs provided by the software provider or other developers. For example, a developer may provide a location identification application, plugin, extension, or the like, which subscribers to a hosted platform service can use with other applications to provide a current user's location for use in other applications.

Customization of code for various subscribers has been achieved by developing managed package code and creating executable code by modifying the managed package code to satisfy the specific needs of individual subscribers. In some instances, a set of code that has been customized for a particular subscriber may contain errors or bugs that need to be debugged by the developer. The developer may not have direct access to subscriber's code or the authority to debug or to modify the subscriber's code when the code is being used by the subscriber's data processing system. In conventional debugging, the developer may create a special release of the code on the developer's platform, transmit the code to the subscriber, and have the subscriber install the code.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter, and together with the detailed description, serve to explain the principles of implementations of the disclosed subject matter. No attempt is made to show structural details in more detail than may be necessary for a fundamental understanding of the disclosed subject matter and various ways in which it may be practiced.

FIG. 10 shows an example of a screen provided by the LMO listing multiple subscriber organizations to allow the developer to select the subscriber to run a debugging session.

FIG. 11 shows an example of a screen displaying subscriber contact information, subscriber login information, name and version of the code to be debugged, and the numbers of available developer licenses and subscriber licenses after the developer selects the subscriber for the debugging session.

FIG. 15 shows another example of an IDE screen displaying a listing of code as viewed by the developer according to an implementation of the disclosed subject matter.

DETAILED DESCRIPTION

Figure 1:
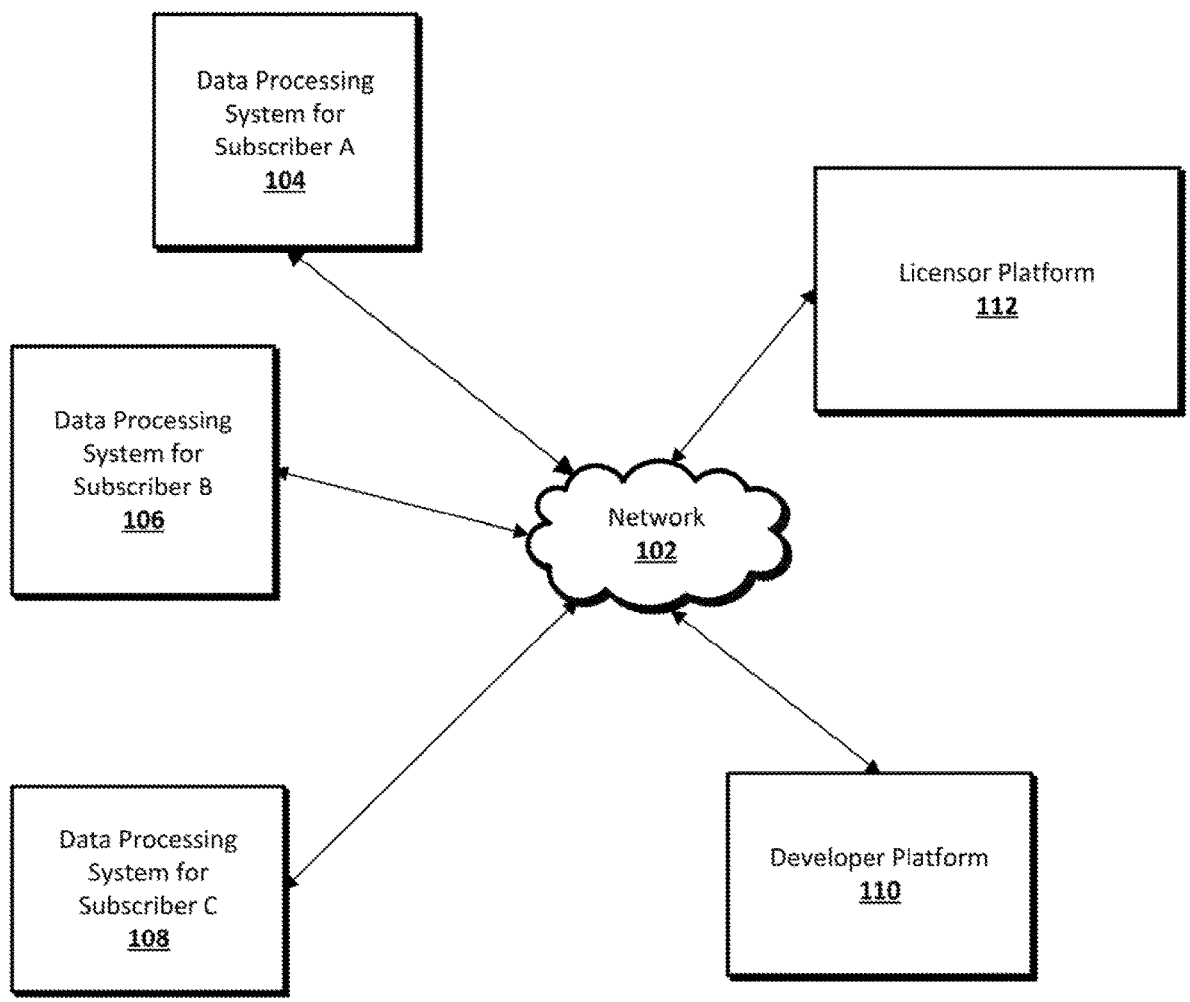
FIG. 1 shows an example of a network configuration according to an implementation of the disclosed subject matter.

Independent software developers or vendors have supplied customized executable code for various subscribers or customers. For each particular subscriber or customer, a set of customized code may be created as managed package code. In some instances, a set of code that has been customized for a particular subscriber or customer may contain bugs that cause runtime errors when the code is being executed on the data processing system of the subscriber or customer. In conventional debugging schemes, the software developer may need to create a special release of the customized code and have the subscriber install the code. In some instances, the developer may need to create and to manage multiple versions of the customized code in order to eliminate errors that the subscriber is experiencing. In some instances, the developer may need to create multiple versions of the code in order to eliminate errors that the subscriber is experiencing and to manage multiple versions of the code during debugging. With different customizations for different subscribers, the developer may need to manage many different versions of the code across multiple subscribers, thus resulting in inefficiency in the use of computing resources and time delay on the part of the developer and the subscribers.

Several disadvantages are associated with conventional schemes for debugging code customized for various subscribers. For example, if a portion of the code customized for one of the subscribers contains a bug, the developer would need to need to create a special release of the customized code, transmit the special release of the code to the subscriber, and then have the subscriber install the code. One of the challenges of conventional debugging of managed package code is that the developer needs to create customized code for each customer, and it may take more than one version or release of the code to eliminate all the bugs in the code. There is also the challenge of managing all different versions for a particular customer, as well as having different versions of the code for different customers. It would be desirable to minimize the number of versions of the code to be created or managed in order to reduce the need for computing resources as well the need for communication bandwidth to transfer various versions of the code between various computers in the network.

Moreover, in a typical debugging session using the conventional debugging scheme, the developer may need to transfer the code back and forth between the subscriber's computer and the developer's computer multiple times in order to complete debugging. For example, the developer may need to transfer the code from the subscriber's computer to the developer's computer, run the debugging tool on the code in the developer's computer, and then transfer the code back to the subscriber's computer. If the code still contains a runtime error after it is debugged for the first time, then it would be necessary to transfer the code from the subscriber's computer back to the developer's computer for a second time to allow the developer to run the debugging tool again. Such a conventional debugging scheme may consume valuable processing and communication resources, thereby slowing down the processing speeds of various computers in the network and reducing bandwidths that otherwise would be available to other communication needs. In some instances, in addition or as an alternative to transferring the code back and forth between the developer's computer and the subscriber's computer, the developer may need to perform on-site debugging or modification of the code at the subscriber's computer, which would result in a waste of time and resources. Moreover, once the subscriber's code is transferred to the developer's computer for debugging, the developer may take possession of the subscriber's code for an indefinite period of time, and it may be difficult for the licensor or the subscriber to control access to the code. Furthermore, the subscriber's code that is transferred to the developer's computer for debugging may contain portions which are proprietary to another developer. It may also impose a burden on the computing resources of the subscriber to excise those portions of the code to which the developer who performs debugging should not have access each time the code is transferred from the subscriber's computer to the developer's computer.

According to embodiments of the disclosed subject matter, a platform is provided to allow the developer to log into a subscriber's computer by using the credential of the subscriber or the developer to view and to debug at least a portion of executable code that is being used by the subscriber. The platform may be provided by a licensor such as a license management organization (LMO), for example. In some implementations, the executable code that is being used by the subscriber may be part of managed package code, at least portions of which have been customized for various subscribers. The developer may run a debugging tool in the subscriber's computer without having to transfer the executable code back and forth between the subscriber's computer and the developer's computer in order for the developer to complete a debugging session. By obviating the need for large amounts of code transfers between the developer's computer and the subscriber's computer that would otherwise consume a large amount of communication bandwidth in the network during a debugging session, the processing speeds of various computers and the communication speeds between various computers in the network may be improved. Moreover, when the developer is able to debug the subscriber's code in the subscriber's computer, the subscriber's code may be modified to conform to or operate with the developer's code during the debugging session in real time or near real time, thereby minimizing the number of versions to be managed by the developer. Furthermore, when the developer performs debugging on the subscriber's computer by using the credentials of the subscriber on the developer's platform, the developer would not need to be physically present at the site of the subscriber, thereby saving valuable time and resources.

In some implementations, a limited number of debugging sessions may be licensed to the subscriber, the developer, or both. In some implementations, if the developer logs into the subscriber's computer system to initiate a debugging session using the credential of the developer, then the debugging session may be counted against the number of debugging sessions licensed to the developer. In some implementations, if the developer logs into the subscriber's computer system to initiate debugging session using the credential of the subscriber, then the debugging session may be counted against the number of debugging sessions licensed to the subscriber. In some implementations, one or more licensed debugging sessions may be transferred between the developer and the subscriber upon consent of the parties or other proper arrangements.

In some implementations, the developer may be prevented from running more than one debugging session at a time. A detection mechanism may be provided in the licensor's platform to detect whether the developer is running another debugging session when the developer attempts to log into the subscriber's computer system to initiate a new debugging session. For example, if the developer is using its own debugging license in an existing debugging session, it may be prevented from using the same license in a new debugging session. In some implementations, each debugging session may have a limited time period, and the debugging session may be terminated upon expiration of the time period. In some implementations, the debugging session may be terminated upon occurrence of an execution error. By limiting the number of debugging sessions to one within a given time period, the potential of having multiple conflicting versions of the code on the subscriber's computer or the developer's computer may be avoided. Moreover, by limiting the amount of time allowed for each debugging session, the licensor or the subscriber would have better control of access to the code.

In some implementations where the set of code customized for a given subscriber is part of managed package code, the developer may be prevented from viewing or debugging other portions of the managed package code other than the set of code customized for the subscriber. In some instances, the managed package code may include multiple sets of code developed by multiple developers, and only the portion of the managed package code that was developed by a particular developer may be accessible to that developer in a debugging session to protect the proprietary interests of other developers. For example, portions of the managed package code that are not authorized for access by a particular developer may be redacted whereas portions of the managed package code that are authorized for access by that developer are permitted to be displayed on the screen of the developer's computer. In such implementations, only the non-redacted portions of the code are presented to the developer during the debugging session, thereby alleviating the burden on the computing resources of the subscriber to excise portions of the code before the code is transferred from the subscriber's computer to the developer's computer in a conventional debugging scheme.

In some implementations, the developer performing a debugging session for a subscriber may be permitted to view at least a portion of code (i.e., the non-redacted portion of code), but may not be permitted to edit any code. In this implementation, the developer may include edits to the code in a new version, and provide the new version to the subscriber. In other implementations, the developer may be permitted to edit the code in a "hot swap" edit. The developer may need special permission from the subscriber to perform the "hot swap" edit.

Various alternative or additional implementations may be contemplated within the scope of the disclosed subject matter. For example, the subscriber may operate a data processing system that has one or more servers, computers, or mobile devices. In some implementations, the developer may be permitted to run an authorized debugging session by using a single session identification across multiple computers, terminals, mobile devices, or servers of the subscriber's data processing system. Depending on the terms of the debugging license, one debugging session may be counted against the subscriber's debugging license or the developer's debugging license even though debugging is performed on multiple computers, mobile devices or servers of the subscriber's data processing system. In other implementations, one debugging session may be counted against the subscriber's license or the developer's license for running a debugging tool on each computer, mobile device or server in the subscriber's data processing system if prescribed by the terms of the license. In some instances, one or more namespaces may be transferred between the developer and the subscriber to facilitate the debugging of the subscriber's code. Other implementations or modifications also may be contemplated within the scope of the disclosed subject matter.

As used herein, "platform" refers to a system that includes a hardware device or architecture, an operating system, or a combination thereof, on which one or more applications, programs or processes may run. As used herein, "code" refers to a computer program having instructions that are executable on one or more platforms. In some implementations, a set of code may be made up of multiple threads of instructions that are capable of being executed concurrently, sequentially, or both concurrently and sequentially. As used herein, "managed package code" refers to code which includes instructions that are applicable to various subscribers as well as instructions that are applicable to a particular subscriber or a particular set of subscribers. That is, the code may be a "package" of code applicable to one or more subscribers, that is "managed" as a whole by the developer. As used herein, "customized code" refers to a portion of managed package code that is applicable to a particular subscriber or a particular set of subscribers.

As used herein, a "debugging tool" refers to a set of executable instructions that detects, and in some implementations, corrects one or more errors in a portion of code. As used herein, a "debugging session" refers to an occurrence of running a debugging tool. In some instances, a debugging session may have a limited time duration. As used herein, "developer" refers to a person or entity that develops, sells or supplies the code. In some instances, a developer may be an independent software developer or independent software vendor (ISV) that is a separate person or entity from a subscriber or customer. As used herein, a "subscriber" refers to person or entity who uses the code supplied by a developer. A subscriber is sometimes referred to as a customer. A subscriber may be an organization that executes code on a computer system or network that comprises one or more servers, computers, terminals, or mobile devices. As used herein, "licensor" refers to a person or entity that grants one or more licenses to permit a developer or a subscriber to debug the code used by the subscriber. A licensor is sometimes referred to as a license management organization (LMO). As used herein, a "namespace" refers to is a set of symbols that are used to organize objects of various kinds such that these objects may be referred to by name. Examples of namespaces include file systems that assign names to files, such as hierarchical file systems that organize files in directories, grouping of symbols or identifiers based on their functionalities to avoid name collisions in computer programming, or the Domain Name System for organization of websites on the Internet. As used herein, a "sandbox" is an isolated, secure or restricted software testing environment that prevents experimental or untested modifications to software from affecting the production environment or repository in which a production version of the software is executed or stored. As used herein, "encapsulation" is an object-oriented coding mechanism to hide the internal representation, such as the value or state of an object, from direct access by unauthorized parties.

FIG. 1 shows an example of a network arrangement according to an implementation of the disclosed subject matter. In FIG. 1, a network 102 is provided which connects a data processing system 104 for Subscriber A, a data processing system 106 for Subscriber B, a data processing system 108 for Subscriber C, a developer platform 110, and a licensor platform 112. Each of the data processing systems 104, 106 and 108 may include one or more servers, mainframe computers, desktop computers, laptop computers, mobile computers such as smart phones, tablet computing devices, or the like, or other apparatus on which code may be executed. The developer may log into the data processing system of a subscriber from the developer platform 110, which may include a single computer or a computer system or network that includes one or more servers, mainframe computers, desktop computers, laptop computers, mobile computers such as smart phones, tablet computing devices, or the like. The licensor platform 112 is a platform that manages debugging licenses granted to the developer or to the subscriber based on whether a given debugging session is counted against the developer's debugging license or the subscriber's debugging license. The licensor platform 112 may include a computer, a server, or multiple computers or servers in a system or network, for example.

The network 102 may be a personal area network (PAN), local area network (LAN), wide area network (WAN), the Internet, or any other suitable communication network or networks, and may be communicate with any of the data processing systems 104, 106 and 108, the developer platform 110, or the licensor platform 112, through various types of connections, such as wired, wireless, or optical connections. In some implementations, one or more of the data processing systems 104, 106 and 108, the developer platform 110 or the licensor platform 112 may access the network 102 through cloud computing arrangements and services (not shown). In some implementations, security measures may be implemented at one or more of the data processing systems or platforms. For example, the data processing system for each of the subscribers may require authentication of the developer upon receiving an attempt by the developer to log into the subscriber's data processing system. In some implementations, the subscriber may implement a permission setting for the developer to access the code that is used by the subscriber's data processing system. For example, the permission setting may limit the developer's access to certain directories, files, documents, code, or the like, times of access, contents that are permitted to be viewed by the developer, portions of code that are permitted to be modified during the debugging session, or the like. Various network arrangements may be implemented within the scope of the disclosed subject matter.

Figure 2:
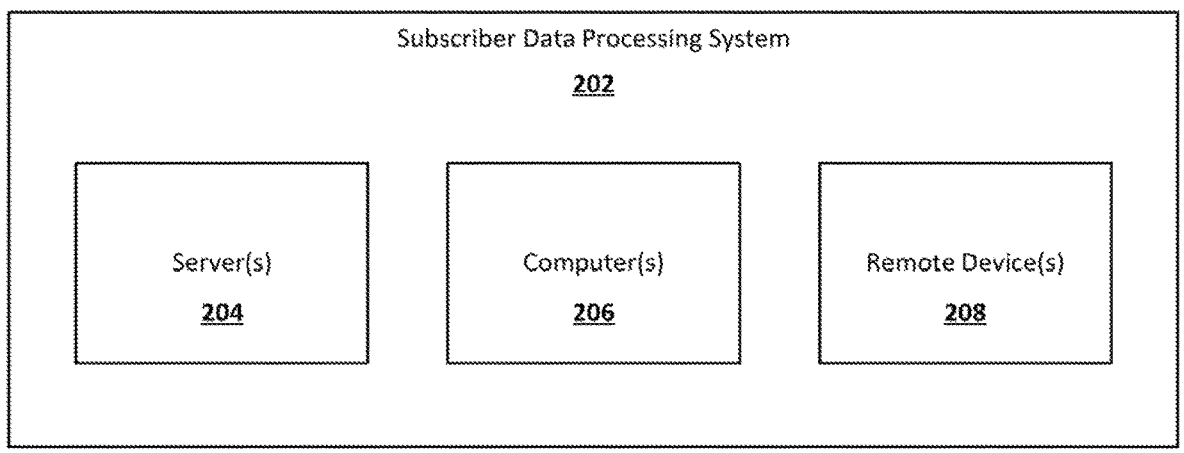
FIG. 2 shows an example of a data processing system of one of the subscribers according to an implementation of the disclosed subject matter.

FIG. 2 shows an example of a data processing system of one of the subscribers according to an implementation of the disclosed subject matter. In FIG. 2, the data processing system 202 includes one or more servers 204, one or more computers 206, and one or more remote devices 208. The servers 204, computers 206 or remote devices 208 may be connected directly to one another or through one or more intermediary devices. The servers 204, computers 206 or remote devices 208 may be connected to one another through wired or wireless connections, for example, over electrical wiring or cabling, through fiber optics, or via electromagnetic radiation. In some implementations, the subscriber data processing system 202 of FIG. 2 may be a data processing system for Subscriber A 104, a data processing system for Subscriber B 106, and/or a data processing system for Subscriber C 108 as shown in FIG. 1.

Figure 3:
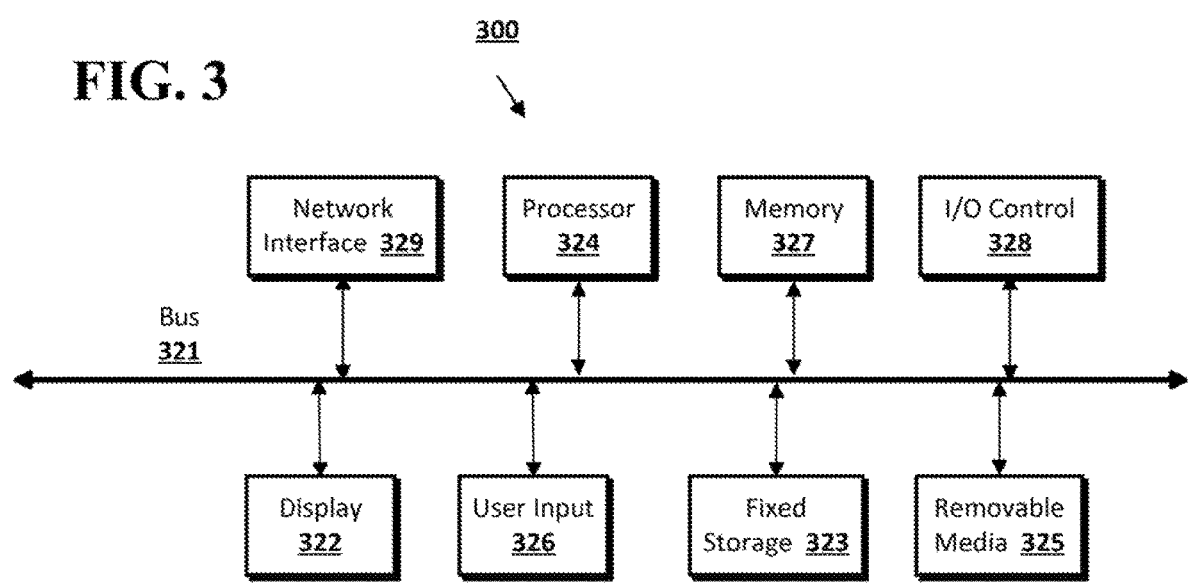
FIG. 3 shows an example of a computer according to an implementation of the disclosed subject matter.

FIG. 3 shows an example of a computer 300 suitable for implementations of the presently disclosed subject matter. The example of the computer as shown in FIG. 3 may be implemented as one of the data processing systems 104, 106 and 108 for the subscribers, the developer platform 110, or the licensor platform 112 as shown in FIG. 1, or any of the servers 204, computers 206 or remote devices 208 as shown in FIG. 2. In FIG. 3, the computer 300 includes a bus 321 which interconnects major components of the computer 300, such as a central processor 324, a memory 327 (typically RAM, but which may also include ROM, flash memory, or the like), an input/output (I/O) controller 328, a user display 322, such as a display screen via a display adapter, a user input interface 326, which may include one or more controllers and associated user input devices such as a keyboard, mouse, or the like, and may be closely coupled to the I/O controller 328, fixed storage 323, such as a hard drive, flash storage, Fiber Channel network, SAN device, SCSI device, or the like, and a removable media component 325 operative to control and receive an optical disk, flash drive, or the like.

The bus 321 allows data communication between the central processor 324 and the memory 327, which may include read-only memory (ROM) or flash memory (neither shown), and random access memory (RAM) (not shown), as previously noted. The RAM is generally the main memory into which the operating system and application programs are typically loaded. The ROM or flash memory can contain, among other code, the Basic Input-Output System (BIOS) which controls basic hardware operation such as the interaction with peripheral components. Applications resident within the computer 300 are generally stored on and accessed via a computer readable medium, such as a hard disk drive (e.g., fixed storage 323), an optical drive, floppy disk, or other storage media such as removable media 325.

The fixed storage 323 may be integral with the computer 300 or may be separate and accessed through other interfaces. A network interface 329 may provide a direct connection to a remote server via a wired or wireless telephone link, a cable link, an optical fiber link, a satellite link or the like, to the Internet via an Internet service provider (ISP), or a direct connection to a remote server via a direct network link to the Internet via a POP (point of presence) or other technique. The network interface 329 may provide such connection using wireless techniques, including digital cellular telephone connection, Cellular Digital Packet Data (CDPD) connection, digital satellite data connection or the like. The network interface 329 may allow the computer to communicate with other computers via one or more local-area, wide-area, or other networks, as shown in FIG. 1.

Many other devices or components (not shown) may be connected in a similar manner (e.g., document scanners, digital cameras and so on). Conversely, all of the components shown in FIG. 3 need not be present to practice the presently disclosed subject matter. The components can be interconnected in different ways from that shown. The operation of a computer such as that shown in FIG. 3 is readily known in the art and is not discussed in detail in this application. Code to implement the presently disclosed subject matter can be stored in computer-readable storage media such as one or more of the memory 327, fixed storage 323, removable media 325, or on a remote storage location, for example, a cloud storage.

More generally, various implementations of the presently disclosed subject matter may include or be implemented in the form of computer-implemented processes and apparatuses for practicing those processes. The processes also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. The processes also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing implementations of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. The processes may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 4A:
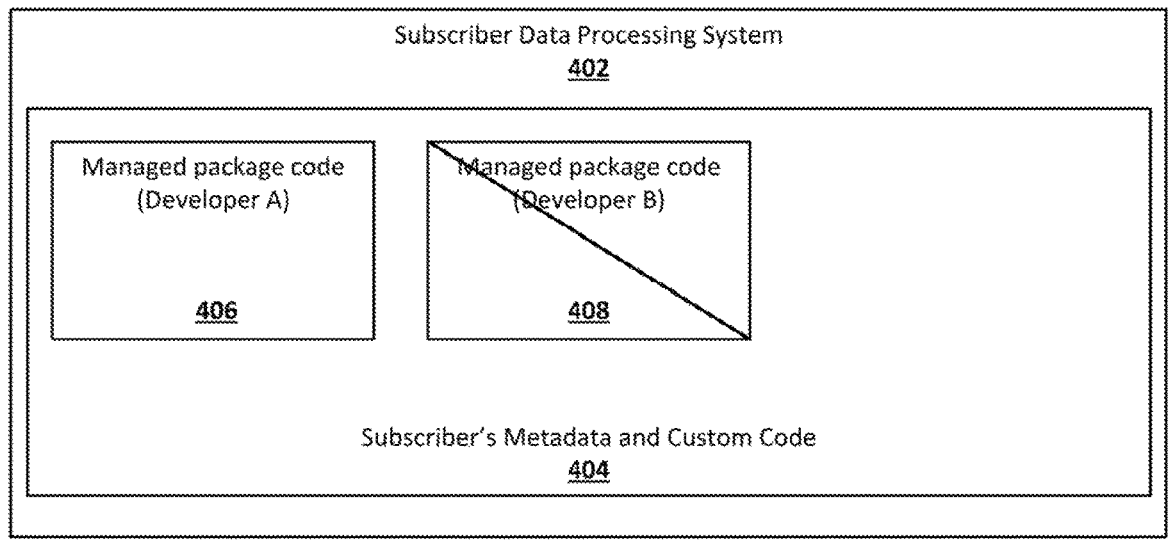
FIG. 4A shows an example of a subscriber's data processing system for running customized code.

FIG. 4A shows an implementation of a subscriber's data processing system for running a set of code customized for the subscriber. In FIG. 4A, the subscriber's metadata and custom code 404 are stored in the subscriber's data processing system 402. In some implementations, the subscriber's custom code may include managed package code 406 developed by Developer A and managed package code 408 developed by Developer B, for example. The subscriber's custom code may also include sets of code developed one or more additional developers independent of one another. In some implementations, one developer is not allowed to view the code developed by another developer to protect the proprietary interests of the developers. In the example shown in FIG. 4A, Developer A is not allowed to view the managed package code 408 developed by Developer B. In some implementations, the subscriber is allowed to execute but is not allowed to view or edit any of the code developed by any of the developers.

Figure 4B:
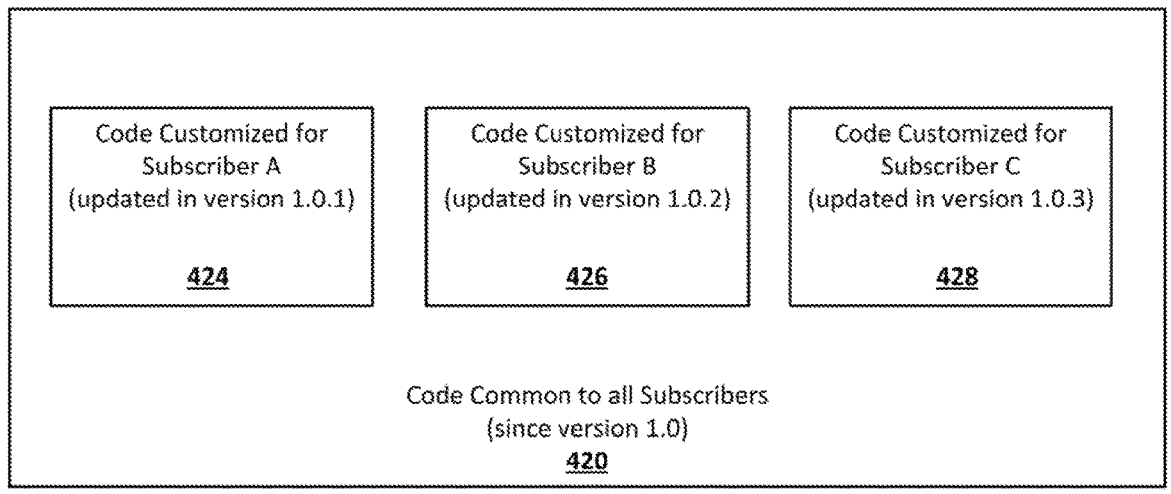
FIG. 4B shows an example of managed package code with customizations for various subscribers according to an implementation of the disclosed subject matter.

FIG. 4B shows an implementation in which the managed package code developed by Developer A includes a set of code 420 common to all subscribers, a set of code 424 customized for Subscriber A, a set of code 426 customized for Subscriber B, and a set of code 428 customized for Subscriber C. In this implementation, the set of code 420 common to all subscribers may include a baseline version, for example, version 1.0, that may be applicable to multiple subscribers with various customizations. The set of code 424 customized for Subscriber A may be an updated version, for example, version 1.0.1, of the baseline version 1.0. Likewise, the set of code 426 customized for Subscriber B may be another updated version, for example, version 1.0.2, of the baseline version 1.0, while the set of code 428 customized for Subscriber C may be yet another updated version, for example, version 1.0.3, of the baseline version 1.0. In some instances, a particular set of code within the managed package code may be customized for a group of subscribers instead of a single subscriber. In some instances, differences between sets of code may exist in different data processing systems for different subscribers even though they are derived from the baseline code, because the code may be modified to satisfy specific requirements of various subscribers. For example, in FIG. 4B, versions 1.01, 1.02 and 1.03 may have the same basic structure as the baseline version 1.0 but with variations in some of the objects, fields, schema, or the like, to satisfy the specific data processing needs of the subscribers.

In some instances, a portion of a set of code customized for one subscriber may also be used by one or more additional subscribers. In some implementations, the executable code customized for Subscriber A, B and/or C 404, 406 and/or 408 may be implemented in one or more of the data processing systems for Subscriber A, B and/or C 104, 106 and/or 108 in FIG. 1. Managed package code may be customized in various manners for various subscribers within the scope of the disclosed subject matter. For example, code may be customized for a particular subscriber by modifying or customizing certain metadata for that subscriber, including, for example, custom objects, fields, schema, or the like. The code may also be customized for processing a given amount data for a particular customer. For example, a set of code may be customized to process one million customer records for a given subscriber. Thus, when a set of code is customized for a given subscriber, two types of errors may be inadvertently created—metadata-dependent errors and data-dependent errors. Metadata-dependent errors include execution errors related to customized metadata, such as customized objects, fields, schema, or the like. Data-dependent errors include execution errors related to handling amounts of data that the subscriber's code was not expected to handle. For example, if a subscriber's customer relationship management (CRM) code that was programmed to handle up to one million customer records is now required to handle one hundred million customer records due to expansion of the subscriber's business, executing the code may result in a data overflow error. Debugging may be needed to correct metadata-dependent errors, data-dependent errors, as well as other types of execution errors.

Figure 5:
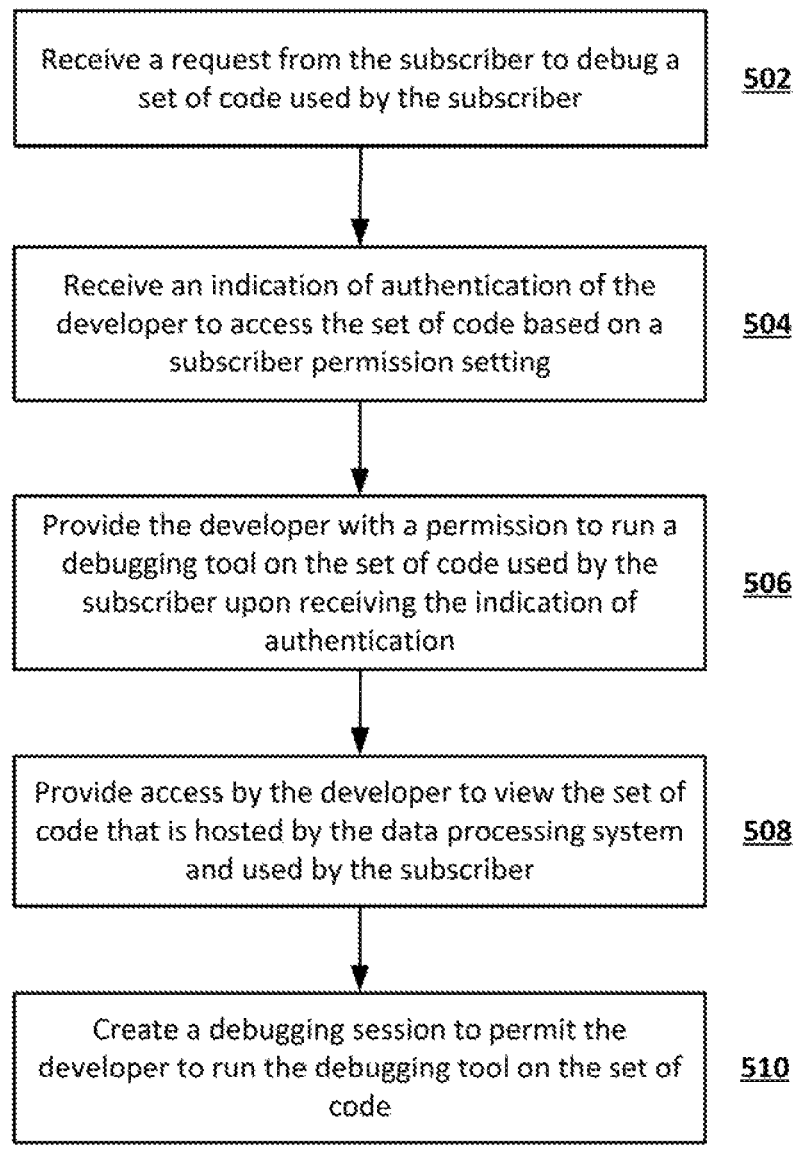
FIG. 5 shows a flowchart illustrating an example of debugging code in a data processing system of a subscriber according to an implementation of the disclosed subject matter.

FIG. 5 shows a flowchart illustrating an example of debugging code in a data processing system of a subscriber according to an implementation of the disclosed subject matter. In some implementations, the data processing system in which the code is debugged may be a data processing system for Subscriber A, B, and/or C 104, 106 and/or 108 as shown in FIG. 1 and described above. In some implementations, the data processing system in which the code is debugged may be a subscriber data processing system 202 as shown in FIG. 2 and described above. Referring to FIG. 5, the data processing system receives a request from the subscriber to debug a set of code that is used by the subscriber in block 502. The subscriber may request that the set of code be debugged due to one or more runtime errors, such as metadata-dependent errors, data-dependent errors, or other types of errors. The developer may be required to provide authentication in order to access the set of code used by the subscriber. In block 504, the data processing system receives an indication of authentication of the developer to access the set of code based on a subscriber permission setting.

In some implementations, the developer may provide authentication by logging into a debugging session with a user name and a password. The developer may log into the debugging session by using the credential of the developer or the credential of the subscriber. In some implementations, if the developer logs into the debugging session by using the credential of the subscriber, then the subscriber's data processing system may require an additional step to verify the identity of the developer before permission to access the subscriber's set of code is granted. As alternatives or in addition, authentication may be achieved in various other manners, for example, by using biometric schemes such as voice recognition, face recognition, fingerprint or retinal scan. In some implementations, authentication of the developer may be performed by the platform of the licensor, and an indication that the developer has been authenticated may be transmitted from the platform of the licensor to the data processing system of the subscriber. In some implementations, authentication of the developer may be performed by the data processing system of the subscriber.

Upon receiving the indication of authentication, the data processing system provides developer with a permission to run a debugging tool on the set of code used by the subscriber in block 506. The data processing system also provides access by the developer to view the set of code that is hosted by the data processing system and used by the subscriber in block 508, and creates a debugging session to permit the developer to run the debugging tool on the set of code used by the subscriber in block 510. In some implementations, the subscriber is not allowed to view or to edit the managed code developed by the developer, but the developer is granted special access to view and to debug the managed code. In some implementations, the subscriber's set of code may include code developed by two or more independent software developers. In such implementations, the developer who is running the debugging session may be permitted to view and to edit only the set of code developed by that developer, but is not permitted to view or to edit other sets of code developed by other developers to protect their proprietary interests. In some implementations, a customized set of code for a particular subscriber may be developed from a reference package developed by the same developer. In order to protect the reference package from inadvertent modification, the developer may be permitted to view but not to edit the code in the reference package while running the debugging session to debug the customized set of code. In some implementations, the debugging session is run on a copy of the subscriber's code in a sandbox such that untested modifications to the subscriber's code will not adversely affect the operation of the subscriber's data processing system.

In some implementations, the developer may be permitted to view the entire set of code hosted on the subscriber's data processing system. In some implementations, the code that the developer is permitted to debug may be restricted to the set of code that was customized for the subscriber as part of managed package code, but the developer is prevented from debugging other portions of the managed package code that are not specifically customized for the subscriber or that are also applicable to other subscribers. In some implementations, the code that resides in the subscriber's data processing system may include portions that were developed by other developers, and the developer may be prevented from viewing or debugging those portions of the code developed by other developers to protect other developers' proprietary interests and/or unintentionally damaging the code provided by other developers, such as by unintentionally changing a portion of the code. For example, portions of the code that the developer is not permitted to access may be redacted from view on the display of the developer's platform when the developer is running a debugging session.

To redact code, the data processing system on which the code is stored, or which is providing the developer access to the code, may remove any representation or copy of the redacted code before providing any code to the developer. For example, the portions of code that are to be redacted may be replaced, prior to sending the code to the developer, with an empty image or other placeholder to indicate that additional code is present but not shown. Similarly, when the developer is provided with a text-editing interface to review and debug the code, the redacted code may be omitted from the text that is sent to the developer.

Figure 6:
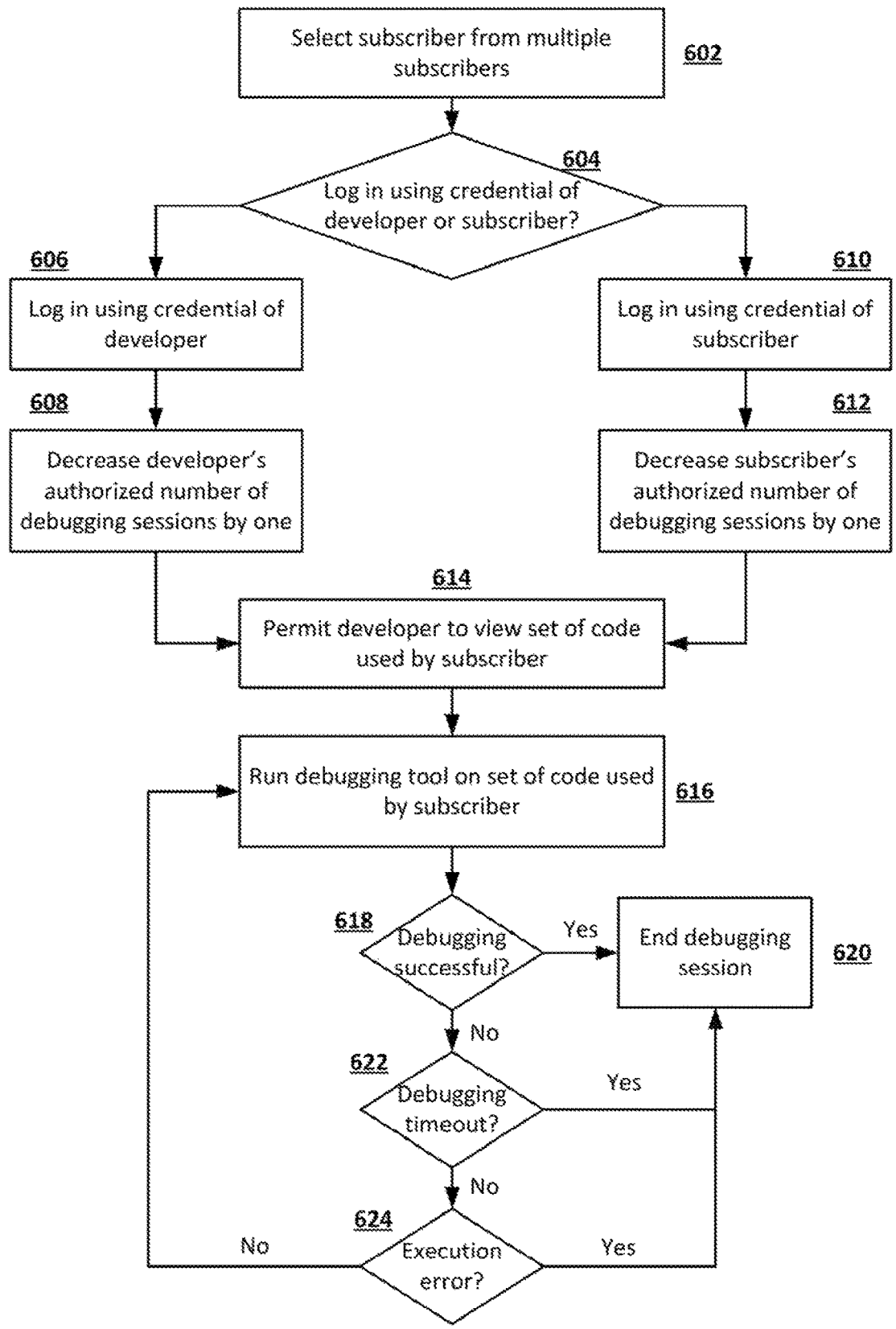
FIG. 6 shows a flowchart illustrating an example of permitting the developer to debug code using the credential of the developer or the subscriber according to an implementation of the disclosed subject matter.

FIG. 6 shows a flowchart illustrating an example of permitting the developer to debug code using the credential of either the developer or the subscriber according to an implementation of the disclosed subject matter. In some implementations, the process of debugging the code using the credential of either the developer or the subscriber may be performed in a data processing system for Subscriber A, B, and/or C 104, 106 and/or 108 as shown in FIG. 1 and described above. In some implementations, the data processing system in which the code is debugged may be a subscriber data processing system 202 as shown in FIG. 2 and described above. Referring to FIG. 6, the set of code that the developer attempts to debug for a particular subscriber may be part of managed package code, at least some portions of which are customized for and used by multiple subscribers. The developer selects the subscriber whose set of code is to be debugged from multiple subscribers in block 602. Selection of the subscriber may be achieved in various manners, for example, by clicking the subscriber's name among a list or menu of multiple subscriber names, or by clicking an icon corresponding to the subscriber on a graphic display. After the subscriber is selected, the developer may choose to log into a debugging session to debug the set of code used by the subscriber by using either the credential of the developer or the credential of the subscriber in block 604.

In some implementations, the subscriber may be provided with a debugging license that authorizes a limited number of debugging sessions to be run by the subscriber. In some implementations, the developer may be provided with a debugging license that authorizes a limited number of debugging sessions to be run by the developer. In some implementations, both the developer and the subscriber may be provided with debugging licenses each authorizing a limited number of debugging sessions. The developer or the subscriber may purchase debugging licenses from the licensor, or obtain debugging licenses from the licensor free of charge, with or without restrictions, in various arrangements. If the developer chooses to log into a debugging session using the credential of the developer in block 606, then the developer's authorized number of debugging sessions is decreased by one in block 608. On the other hand, if the developer chooses to log into a debugging session using the credential of the subscriber in block 610, provided that the developer has obtained consent to do so from the subscriber, then the subscriber's authorized number of debugging sessions is decreased by one in block 612. In some implementations, a debugging session that is run on a subscriber's data processing session is charged against either the developer's debugging license or the subscriber's debugging license, but not both.

After the developer logs into the debugging session using either the credential of the developer or the credential of the subscriber, the developer is permitted to view the set of code used by the subscriber in block 614. As described above, in some implementations, the developer may be permitted to view the entire set of code hosted by the subscriber's data processing system, whereas in other implementations, the developer may be restricted to viewing certain portions of the code hosted by the subscriber's data processing system. For example, portions of the code developed by another developer may be prevented from being viewed by the developer who is running the debugging session by redaction while portions of the code that the developer is permitted to debug are displayed on the screen of the developer's platform as previously disclosed.

In some implementations, lines of code that are not permitted to be shown to the developer may be obfuscated or concealed from view on the screen of the developer's computer in various manners, for example, by darkened or blank lines, or by simply eliminating those lines between non-obfuscated or non-concealed portions of the code. In some implementations, even if a certain portion of the code is not shown to the developer, input/output interfaces and/or a functional description of that portion of the code may be provided to the developer to facilitate debugging of the code. The developer runs the debugging tool on the set of code used by the subscriber in block 616. Again, in some implementations, the developer may be permitted to run the debugging tool on the entire set of code hosted by the subscriber's data processing system, whereas in other implementations, the developer may be restricted to running the debugging tool on certain portions of the code hosted by the subscriber's data processing system as previously disclosed.

After the debugging tool is run on the set of code for the first time in block 616, a determination is made as to whether the debugging is successful in block 618. The determination may be made, for example, by confirming that the modified code executed without error, either automatically or through an interface provided to the developer. If it is determined that debugging is successful, then the debugging session terminates in block 620. On the other hand, if it is determined that debugging is unsuccessful, then a determination is made as to whether the debugging session has exceeded a time limit in block 622. If it is determined that the debugging session has exceeded the time limit, then the debugging session terminates in block 620. On the other hand, if the debugging session has not reached the time limit, then a determination is made as to whether an execution error has occurred during the debugging session in block 624. If it is determined that an execution error has occurred, then the debugging session terminates in block 620. On the other hand, if the debugging has not been successful for the first time, has not reached the time limit, and has not produced an execution error, then the developer may run the debugging tool on the set of code used by the subscriber again in block 616.

Figure 7:
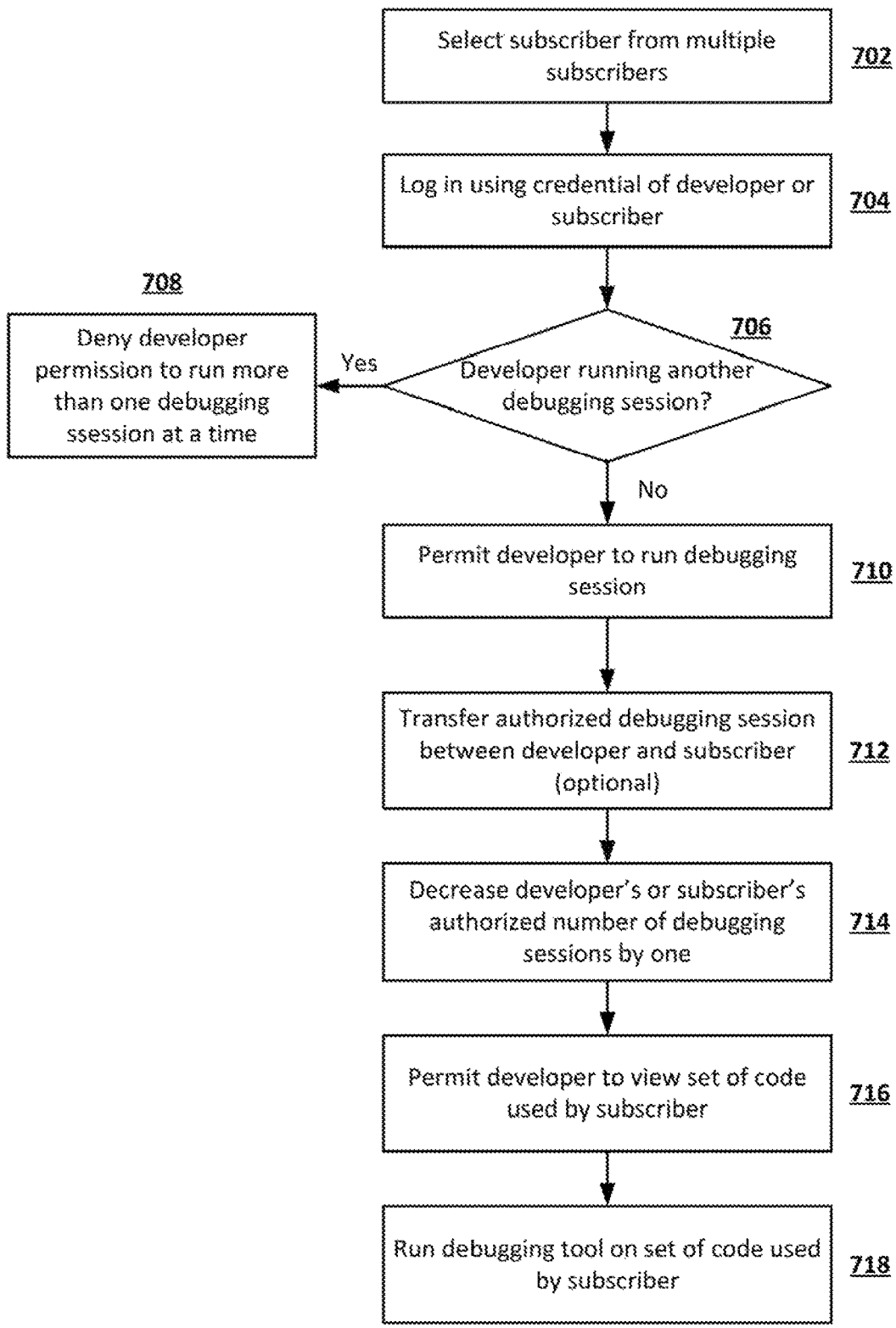
FIG. 7 shows a flowchart illustrating an example of ensuring that the developer is permitted to run no more than one debugging session at a time according to an implementation of the disclosed subject matter.

FIG. 7 shows a flowchart illustrating an example of ensuring that the developer is permitted to run no more than one debugging session at a time according to an implementation of the disclosed subject matter. In some implementations, the process of ensuring that the developer is permitted to run no more than one debugging session at a time may be performed by a licensor platform 112, a developer platform 110, or a data processing system for Subscriber A, B, and/or C 104, 106 and/or 108 as shown in FIG. 1 and described above. In some implementations, the data processing system in which the code is debugged may be a subscriber data processing system 202 as shown in FIG. 2 and described above.

Referring to FIG. 7, the developer selects the subscriber whose set of code is to be debugged from multiple subscribers in block 702, and logs into a debugging session using the credential of either the developer or the subscriber in block 704. A determination is made as to whether the developer is running another debugging session in block 706. If it is determined that the developer is running another debugging session while attempting to initiate a new debugging session, then the developer is denied permission to run more than one debugging session at a time in block 708. In some implementations, the developer is permitted to run no more than one debugging session at a time to ensure that multiple debugging sessions are not counted as one session against the debugging license. In some implementations, the licensor's platform may determine whether the developer is running another debugging session and deny the developer permission to run more than one debugging session at a time. In some implementations, a data processing system may debug multiple threads of a code, either synchronously or asynchronously, while running a single debugging session. In some implementations, debugging may be performed on one or more threads of code with asynchronous processing in the background while running a single debugging session.

After it is determined that the developer is not running another debugging session while attempting to initiate a new debugging session in block 706, the developer is permitted to run the new debugging session in block 710. In some implementations, both the developer and the subscribers may be granted debugging licenses each authorizing a limited number of debugging sessions. In some instances, the developer or the subscriber may have a shortage of authorized number of debugging sessions remaining in its debugging license. In some implementations, one or more authorized number of debugging sessions may be transferred between the developer and the subscriber in block 712. For example, if the developer has a shortage in the remaining number of authorized debugging sessions in its debugging license, it may request and the subscriber may grant a transfer of an authorized debugging session from the subscriber's debugging license to the developer's debugging license. On the other hand, if the subscriber has a shortage in the remaining number of authorized debugging sessions in its debugging license, the developer may transfer an authorized debugging session from the developer's debugging license to the subscriber's debugging license. Transfers of authorized debugging sessions between the developer's debugging license and the subscriber's debugging license may be made free of charge or upon valuable consideration.

Depending on whether the new debugging session is charged against the developer's or the subscriber's debugging license, the authorized number of debugging sessions in either the developer's or the subscriber's debugging license is decreased by one in block 714. The above-described process steps need not be performed exactly according to the sequence illustrated in FIG. 7. For example, if the developer has no authorized debugging session remaining in its debugging license before initiating a new debugging session, then the subscriber may transfer an authorized debugging session from its debugging license to the developer in block 712 before the developer logs into the new debugging session in block 704. After the developer successfully logs into the debugging session by using either the developer's or the subscriber's credential, the developer is permitted to view the set of code used by the subscriber in block 716 and to run the debugging tool on the set of code in block 718. As described above, in some implementations, the developer may be permitted to view and to debug the entire set of code hosted on the subscriber's data processing system, whereas in other implementations, the developer may be restricted from viewing or debugging one or more portions of the code hosted on the subscriber's data processing system. In some implementations, the subscriber, being an end user and not a developer of the code, is not permitted to view the code even if it possesses a debugging license, whereas the developer is permitted to view at least the portion of the code that it is authorized to access and to debug.

Figure 8:
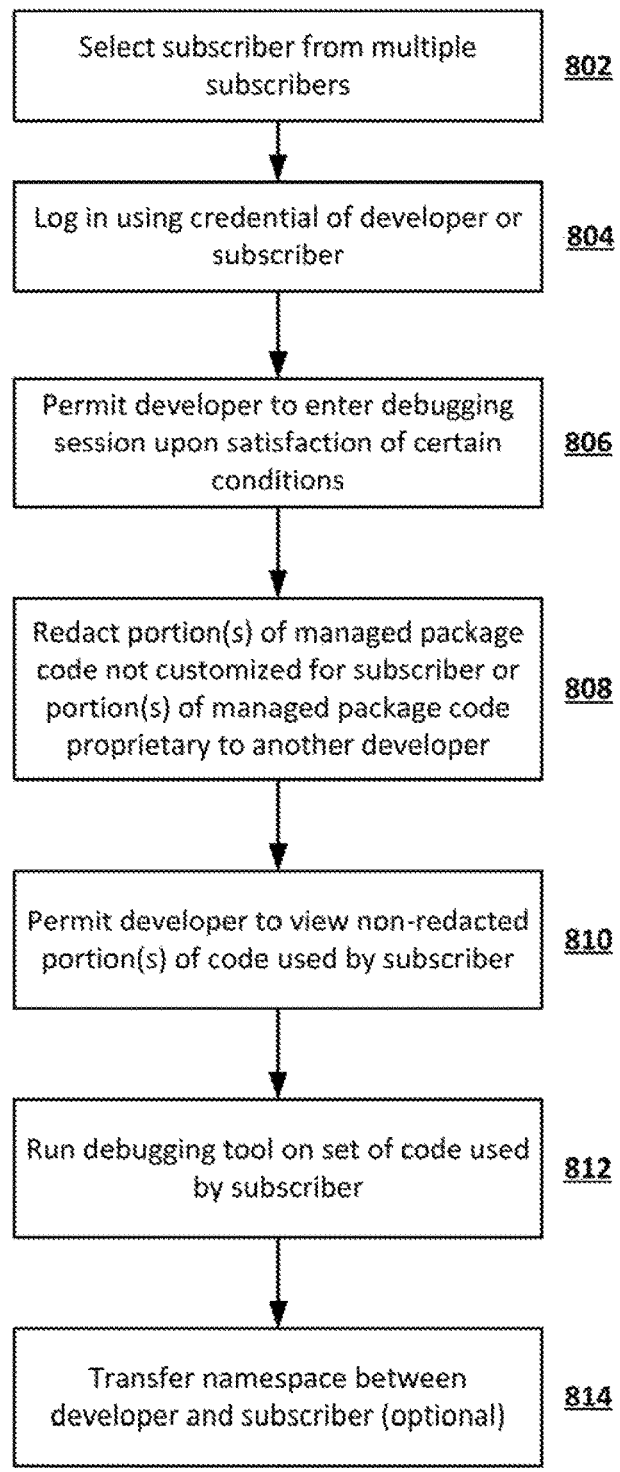
FIG. 8 shows a flowchart illustrating an example of redacting one or more portions of managed package code that the developer is not authorized to view or to debug according to an implementation of the disclosed subject matter.

FIG. 8 shows a flowchart illustrating an example of redacting one or more portions of managed package code that the developer is not authorized to view or to debug according to an implementation of the disclosed subject matter. In some implementations, the redaction of one or more portions of managed package code may be performed by a data processing system for Subscriber A, B, and/or C 104, 106 and/or 108, or by a licensor platform 112 as shown in FIG. 1 and described above. In some implementations, the data processing system in which the code is debugged may be a subscriber data processing system 202 as shown in FIG. 2 and described above. Referring to FIG. 8, the developer selects the subscriber whose set of code is to be debugged from multiple subscribers in block 802, and logs into a debugging session using the credential of either the developer or the subscriber in block 804. The developer is permitted to enter the debugging session upon satisfaction of certain conditions described above, including, for example, the authentication of the developer, the availability of an authorized debugging session in the developer's or the subscriber's debugging license, and the restriction that the developer is not permitted to run more than one debugging session at a time.

In the implementation shown in FIG. 8, the developer is not permitted to view the entire code. For example, portions of the code may be developed by and proprietary to another developer. As another example, portions of managed package code that are not customized for a particular subscriber may not be permitted to be viewed or may be immutable. If a managed package code version is immutable, modifications would not permitted for that version, and an incremented version of the package would be required to debug and to test any modifications to the package. Portions of the managed package code that are not customized for the subscriber or portions of the managed package code that are proprietary to another developer may be redacted in block 808. The developer is permitted to view non-redacted portions of the code used by the subscriber in block 810, and to run a debugging tool on the set of code used by the subscriber in block 812. In some implementations, one or more namespaces may be transferred between the developer and the subscriber to facilitate the running of the debugging tool in block 814. In some implementations, the developer may be permitted to edit only the customized code for a particular subscriber in a debugging session, but is not permitted to edit the managed package code. If it becomes necessary to edit the managed package code while performing debugging for a subscriber, the developer may be required to seek special permission from the licensor or LMO, for example, by requesting and obtaining a special license different from a debugging license for a subscriber, before the developer is allowed to proceed with editing the managed package code.

Figure 9:
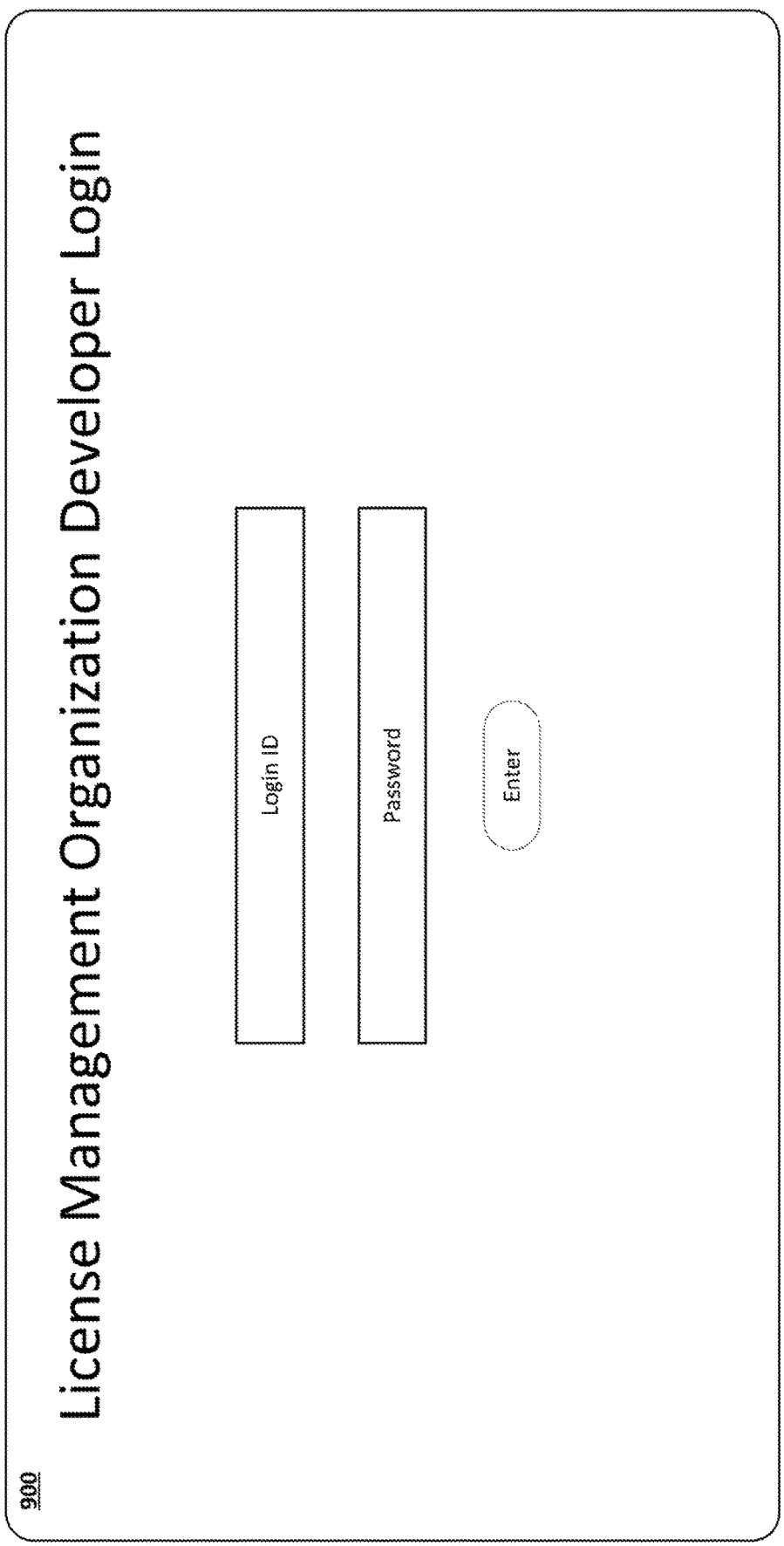
FIG. 9 shows an example of a license management organization (LMO) login screen for the developer.

FIG. 9 show an example of a license management organization (LMO) login screen for the developer. The screen 900 shown in FIG. 9 may be a simplified interactive login screen provided by a licensor or LMO which allows a developer to log in using a login identification and a password assigned to the developer. In some implementations, the LMO login screen may also include logos, graphics or other features known to persons skilled in the art of website design. In some implementations, in addition or as alternatives to using login identification and password, other schemes of authenticating the developer may be used, including, for example, biometric measures such as fingerprints or retina scans, or two-factor authorization mechanisms such as mobile phone verification, USB key verification, or smart chip verification. Other verification techniques such as Internet Protocol (IP) address restriction may also be used. Authentication requests or responses may be transmitted through wired or wireless connections, such as Wi-Fi, Bluetooth, Radio Frequency Identification (RFID) or Near-Field Communication (NFC).

FIG. 10 shows an example of a screen provided by the LMO after the developer logs in, listing multiple subscriber organizations managed by the LMO to allow the developer to select the subscriber to run a debugging session. The screen 1000 shown in FIG. 10 may be a simplified interactive screen showing a list of multiple subscribers. In some implementations, a large number of subscribers may be managed by the LMO. For example, a complete list of subscribers may be too lengthy to be listed on a single screen, and the list of subscribers may be scrolled up or down, paginated, or presented in various manners apparent to persons skilled in the art. In some implementations, the subscriber listing screen may also include logos, graphics or other features known to persons skilled in the art of website design. The developer may select one of the subscribers clicking the subscriber name or organization identification on the screen, for example.

FIG. 11 is an example of a screen showing subscriber contact information, subscriber login information, name and version of the code to be debugged, and numbers of available licenses after the developer selects one of the multiple subscribers shown in FIG. 10 to enter a debugging session. The screen 1100 as shown in FIG. 11 includes a display of contact information, user identification, user name, action to be taken, such as debugging, modification, or new release, code name, code version, namespace, the number of developer licenses, the number of subscriber licenses and the total number of licenses for debugging. In some implementations, access to an existing set of code may be controlled by limiting the number of subscriber licenses and/or the number of developer licenses for debugging sessions, as well as limiting the amount of time permitted for each debugging session. Various other types of subscriber information may also be displayed on the screen, and the subscriber information displayed on the screen may be displayed in various manners apparent to persons skilled in the art. In some implementations, the subscriber listing screen may also include logos, graphics or other features known to persons skilled in the art of website design.

Figure 12:
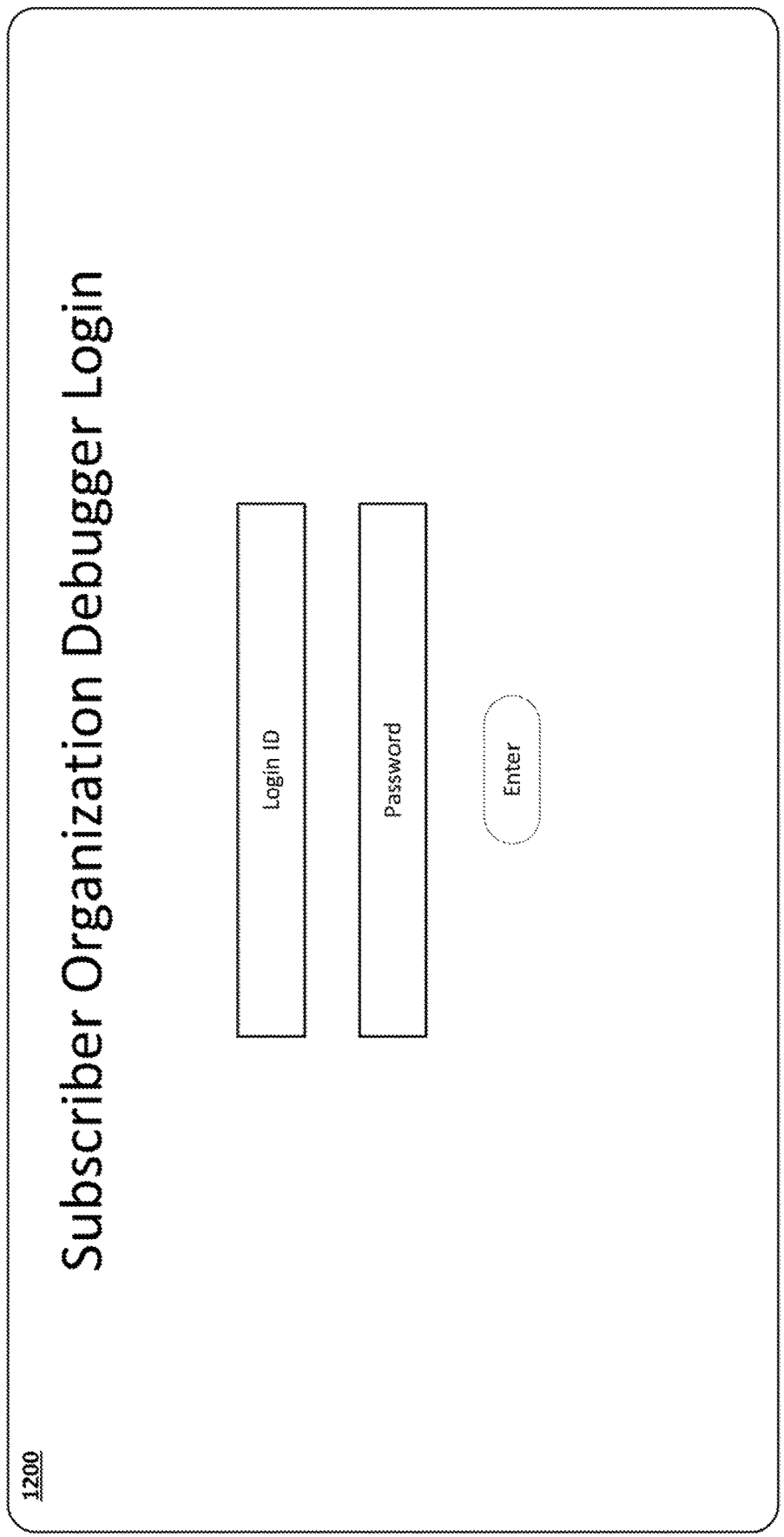
FIG. 12 shows an example of a subscriber organization login screen for the developer to log into a debugging session of the subscriber.

FIG. 12 shows an example of a subscriber organization login screen for the developer to log into a debugging session of the subscriber. The screen 1200 as shown in FIG. 12 may be a simplified interactive login screen which allows the developer to log into a debugging session to debug the subscriber's code using the login identification and password of the subscriber. Again, the subscriber login screen may include logos, graphics or other features known to persons skilled in the art of website design.

Figure 13:
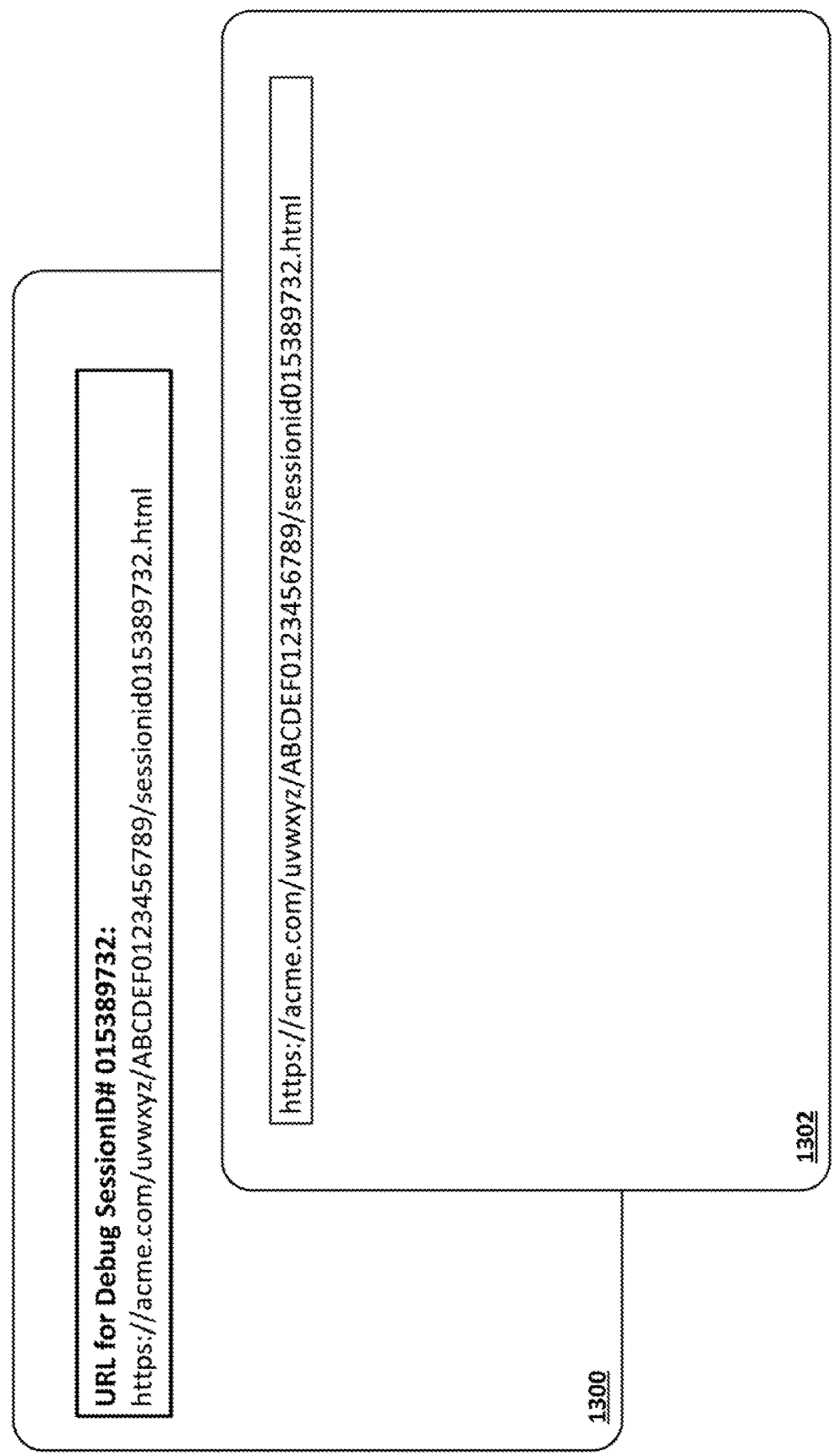
FIG. 13 shows an example of interactive display screens illustrating a drag-and-drop operation of moving the uniform resource locator (URL) for a debugging session to an integrated development environment (IDE) to create the debugging session.

FIG. 13 shows an example of interactive display screens illustrating an optional drag-and-drop operation of moving the uniform resource locator (URL) for a debugging session into an integrated development environment (IDE) to create a debugging session. In some implementations, once the developer logs into a debugging session using the user identification and password of the subscriber as illustrated in FIG. 12, the developer may be presented with a URL corresponding to a session identification for a particular debugging session and a set of subscriber's code to be debugged. In FIG. 13, the URL in screen 1300 presented to the developer may be a web address, a hypertext transfer protocol (http), a hypertext transfer protocol secure (https), a file transfer protocol (ftp), an email address, a file directory and file name, a database access protocol, or the like. Once presented with the URL in screen 1300, the developer is allowed to drag and drop the URL into an integrated development environment (IDE) on another screen, such as screen 1302, to create the debugging session. The IDE may include basic tools that a developer needs to write, test, and/or debug code. In some implementations, an IDE may contain a code editor, a compiler or interpreter, and a debugger that the developer is allowed to access through a graphic user interface (GUI). An IDE may be a standalone application or included as part of one or more integrated applications. In some implementations, the IDE screen may be a separate screen from the URL screen presented to the developer. In some implementations, the URL screen and the IDE screen may be under separate tabs on the same screen, where one of the URL and IDE screens may be displayed while the other one is hidden, depending on which tab is clicked by the developer. In some implementations, the URL screen and the IDE screen may be presented simultaneously on a display. The URL and IDE screens may be presented in various manners apparent to persons skilled in the art.

Figure 14:
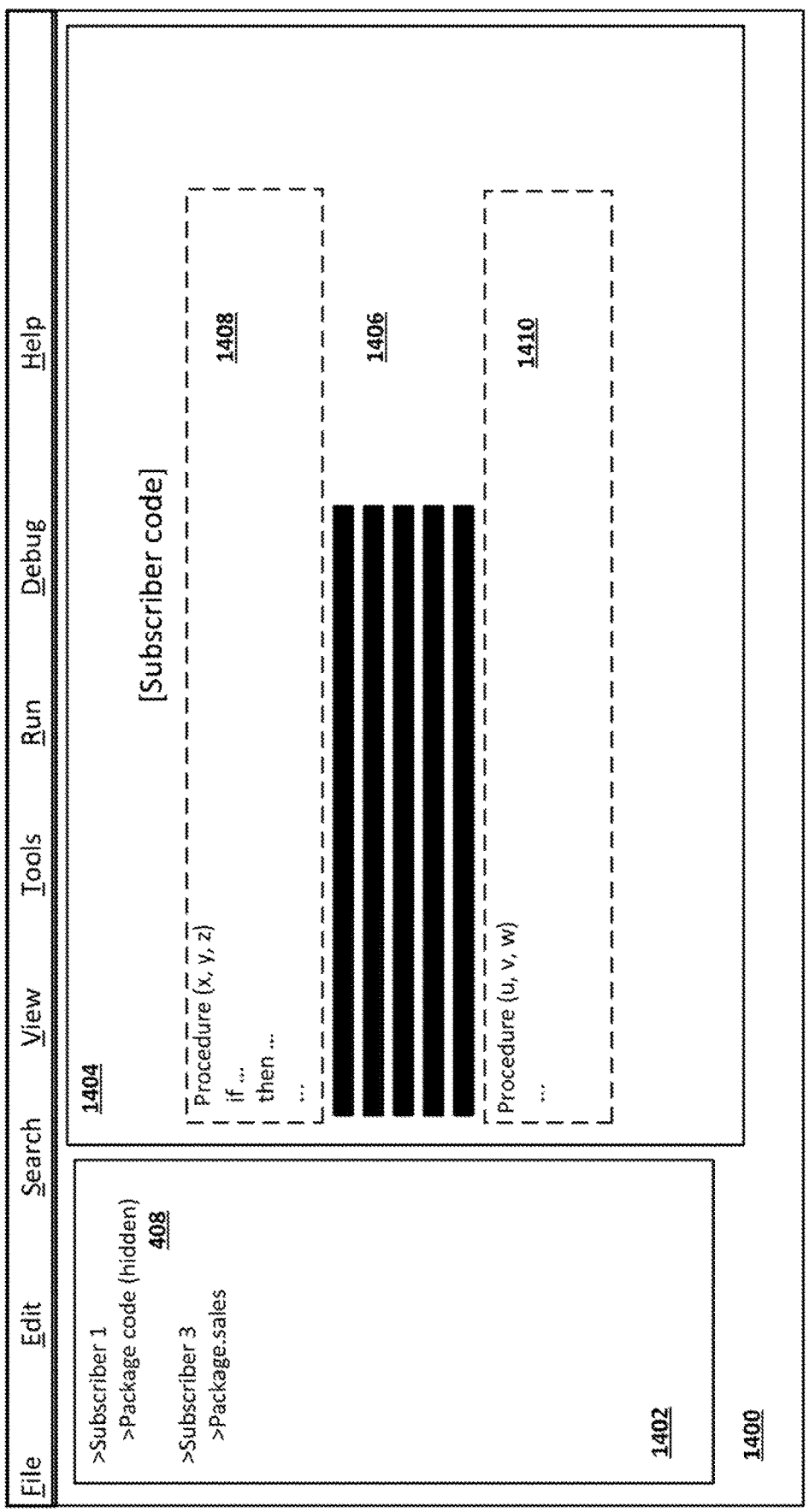
FIG. 14 shows an example of an integrated development environment (IDE) screen displaying a listing of code with partial redaction as viewed by the developer according to an implementation of the disclosed subject matter.

FIG. 14 shows an example of an integrated development environment (IDE) screen displaying a listing of code with partial redaction as viewed by the developer. In the example shown in FIG. 14, the IDE screen 1400 includes a directory tree window 1402 showing the location and file name of the code that is being debugged and a code window 1404 showing a listing of the subscriber code. In the code window 1404, the redacted portion 1406 of the code is shown as darkened bars 1402. The redacted portion 1406 of the code may be presented to the developer on the display screen in various manners apparent to persons skilled in the art, such as blanks or empty lines instead of darkened bars. In addition or as alternatives, code with one or more redacted, obfuscated or concealed portions may be presented to the developer in other manners, for example, by encapsulating the code, by limiting what is displayed on the screen of the developer's computer, or by providing public interfaces to redacted, obfuscated or concealed portions of the code without their private implementations, an example of which will be described with reference to FIG. 15.

The developer may be prevented from viewing and modifying the redacted portion of the code for various reasons. For example, the redacted portion of the code may be developed by another developer, may contain proprietary information that is not permitted to be accessed by the developer who is performing debugging, or may be protected from unintentional modification by the developer. In some implementations, redactions may be made by the subscriber's data processing system, such as the data processing system 104, 106 and/or 108 in FIG. 1 or the data processing system 202 in FIG. 2. In FIG. 14, portions of the code that are not redacted, such as portions 1408 and 1410, may be viewed, debugged or modified by the developer in the IDE.

Figure 15:
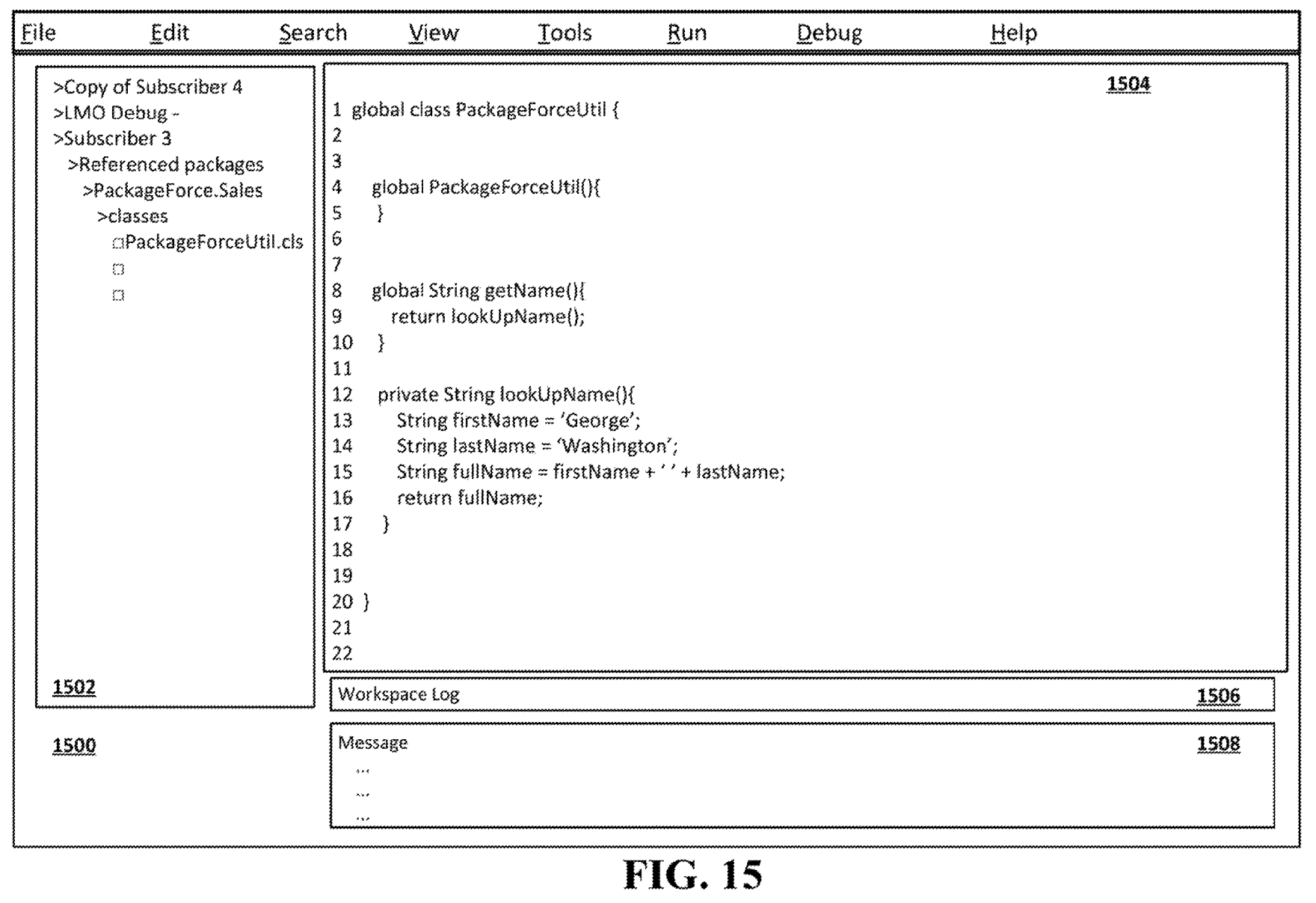

FIG. 15 shows another example of an IDE screen displaying a listing of code as viewed by the developer according to an implementation of the disclosed subject matter. In the example shown in FIG. 15, the IDE screen 1500 includes a directory tree window 1502, a code window 1504, an optional workspace log window 1506, and an optional message window 1508. In the directory tree window 1502, under the folder for Subscriber 3, there is a folder for Referenced packages, and under Reference packages, there is a folder for PackageForce.Sales. Under PackageForce.Sales, there is a folder for classes, which includes file names such as PackageForceUtil.cls. In the example shown in FIG. 15, portions of the customized code for the classes in PackageForceUtil.cls are editable in a debugging session.

An example of a listing of the code in PackageForceUtil.cls is shown in the code window 1504. The code listing includes global class PackageForceUtil{ }, global PackageForceUtil( ){ }, global String getName( ){ }, and private String lookUpName( ){ }. In this example, only the code lines in private String lookUpName( ){ } are displayed in the code window 1504. No code listing within global class PackageForceUtil{ } or global PackageForceUtil( ){ } is displayed at all. That is, in this example, the developer viewing the code in the code window 1504 of the IDE screen 1600 may not have permission to view the code associated with the PackageForceUtil( ) and getName( ), but may have permission to view the code associated with lookUpName( ) for debugging purposes. In global String getName( ){ }, only one line of code, return lookUpName ( ), is shown to the developer to inform the developer of the interface of global String getName( ){ }. The developer can view the lines of code in private String lookUpName ( ){ } when running a debugging session. Lines of code that are obfuscated or concealed in global class PackageForceUtil { }, global PackageForceUtil ( ){ } and global String getName ( ){ } may be displayed as blank lines or simply be eliminated in the code window 1504. That is, in the foregoing example, permissions granted by the subscriber to the developer determine which code is viewable to a particular developer for debugging purposes, while keeping other portions of code (e.g., such as those developed by other developers) private and non-viewable.

In some instances, portions of the code may be developed by another developer who reserves proprietary rights in those portions of the code, and the developer who is running the debugging session is thus prevented from viewing those portions of the code. In some implementations, in order for the developer to gain an understanding of the overall structure of the code during a debugging session, the developer may be presented with a class, a function, a procedure, a routine or the like, without revealing the actual code within the class, function, procedure, routine or the like, by encapsulating the code, by redacting, obfuscating or concealing at least a portion of the code, by displaying only public input/output interfaces, parameters or arguments, or by displaying comments instead of the actual code. In some implementations, the developer who is running the debugging session may be permitted to view at least a portion of the reference package to the extent necessary for debugging, but is not permitted to edit any code in the reference package. The developer may need to create a new version which includes edits to subscriber's code before releasing it to the subscriber. In other implementations, the developer may be permitted to edit the code in the reference package in a "hot swap" edit, but may need special permission from the LMO to do so.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method for a developer to debug code in a data processing system of a subscriber, the method comprising:
receiving, at the data processing system, a request from the subscriber to debug a set of code used by the subscriber;
receiving, at the data processing system, an indication of authentication of the developer to access the set of code based on a subscriber permission setting;
providing, by the data processing system, the developer with a permission to run a debugging tool on the set of code used by the subscriber upon receiving the indication of authentication;

providing, by the data processing system, access by the developer to view the set of code that is hosted by the data processing system and used by the subscriber; and creating, by the data processing system, a debugging session to permit the developer to run the debugging tool on the set of code, wherein the subscriber accesses the data processing system using a credential assigned to the subscriber, and the subscriber is separate from the developer.

2. The method of claim 1, further comprising receiving, at the data processing system, a request from the developer to select the subscriber from a plurality of subscribers.

3. The method of claim 1, wherein providing, by the data processing system, access to the developer to view the set of code that is hosted by the data processing system and used by the subscriber comprises permitting the developer to log in to the debugger session using a credential of the developer.

4. The method of claim 1, wherein providing, by the data processing system, access to the developer to view the set of code that is hosted by the data processing system and used by the subscriber comprises permitting the developer to log in to the debugger session using the credential of the subscriber.

5. The method of claim 1, wherein the developer is permitted to run an authorized number of debugging sessions, further comprising decreasing the authorized number of debugging sessions by one upon creating, by the data processing system, the debugging session to permit the developer to run the debugging tool on the set of code.

6. The method of claim 1, wherein the subscriber is permitted to run an authorized number of debugging sessions, further comprising decreasing the authorized number of debugging sessions by one upon creating, by the data processing system, the debugging session to permit the developer to run the debugging tool on the set of code.

7. The method of claim 1, wherein the developer is permitted to run a first authorized number of debugging sessions and the subscriber is permitted to run a second authorized number of debugging sessions, further comprising transferring at least one authorized debugging session between the developer and the subscriber.

8. The method of claim 1, further comprising preventing, by the data processing system, the developer from running more than one debugging session at a time.

9. The method of claim 1, further comprising terminating, by the data processing system, the debugging session upon expiration of a limited time.

10. The method of claim 1, further comprising terminating, by the data processing system, the debugging session upon occurrence of an execution error.

11. The method of claim 1, wherein the set of code comprises a portion of managed package code customized for the subscriber.

12. The method of claim 11, wherein the developer is prevented from viewing another portion of the managed package code other than the set of code customized for the subscriber.

13. The method of claim 11, wherein the developer is prevented from debugging another portion of the managed package code other than the set of code customized for the subscriber.

14. The method of claim 1, wherein the set of code comprises a portion of managed package code, and wherein another portion of the managed package code is not authorized for access by the developer, further comprising redacting the other portion of the managed package code that is not authorized for access by the developer.

15. The method of claim 1, wherein the developer is permitted to run an authorized debugging session across a plurality of computers or servers of the subscriber with a session identification.

16. The method of claim 1, further comprising transferring, by the data processing system, a namespace between the developer and the subscriber.

17. The method of claim 1, further comprising transferring, by the data processing system, a uniform resource locator (URL) for the debugging session to an integrated development environment (IDE) to create the debugging session.

18. An apparatus for a developer to debug code in a data processing system of a subscriber, the system comprising:
a processor; and
a memory communicably coupled to the processor, the memory including computer instructions configured to cause the processor to:
receive a request from the subscriber to debug a set of code used by the subscriber;
receive an indication of authentication of the developer to access the set of code based on a subscriber permission setting;
provide the developer with a permission to run a debugging tool on the set of code used by the subscriber upon receiving the indication of authentication;
provide access by the developer to view the set of code that is hosted by the data processing system and used by the subscriber; and
create a debugging session to permit the developer to run the debugging tool on the set of code,
wherein the subscriber accesses the data processing system using a credential assigned to the subscriber, and the subscriber is separate from the developer.

19. The apparatus of claim 18, wherein the computer instructions to provide access to the developer to view the set of code that is hosted by the data processing system and used by the subscriber comprise computer instructions to permit the developer to log in to the debugger session using a credential of the developer.

20. The apparatus of claim 18, wherein the computer instructions to provide access to the developer to view the set of code that is hosted by the data processing system and used by the subscriber comprise computer instructions to permit the developer to log in to the debugger session using the credential of the subscriber.

21. The apparatus of claim 18, wherein the developer is permitted to run an authorized number of debugging sessions, and wherein the computer instructions further comprise computer instructions to decrease the authorized number of debugging sessions by one upon creating the debugging session to permit the developer to run the debugging tool on the set of code.

22. The apparatus of claim 18, wherein the subscriber is permitted to run an authorized number of debugging sessions, and wherein the computer instructions further comprise computer instructions to decrease the authorized number of debugging sessions by one upon creating the debugging session to permit the developer to run the debugging tool on the set of code.

23. The apparatus of claim 18, wherein the developer is permitted to run a first authorized number of debugging sessions and the subscriber is permitted to run a second authorized number of debugging sessions, and wherein the computer instructions further comprise computer instructions to transfer at least one authorized debugging session between the developer and the subscriber.

24. The apparatus of claim 18, wherein the computer instructions further comprise computer instructions to prevent the developer from running more than one debugging session at a time.

25. The apparatus of claim 18, wherein the set of code comprises a portion of managed package code customized for the subscriber, and wherein the developer is prevented from debugging another portion of the managed package code other than the set of code customized for the subscriber.

26. The apparatus of claim 18, wherein the set of code comprises a portion of managed package code, wherein another portion of the managed package code is not authorized for access by the developer, and wherein the computer instructions further comprise computer instructions to redact the other portion of the managed package code that is not authorized for access by the developer.

* * * * *